United States Patent [19]

Hubka et al.

[11] 4,158,202

[45] Jun. 12, 1979

[54] RECEIVER BANDWIDTH CONSERVATION IN A DOPPLER RADAR

[75] Inventors: Theodore Hubka, Pleasantville; Robert W. Slater, Bardonia, both of N.Y.

[73] Assignee: The Singer Company, Little Falls, N.J.

[21] Appl. No.: 854,571

[22] Filed: Nov. 25, 1977

[51] Int. Cl.² .............................................. G01S 9/46
[52] U.S. Cl. ..................................... 343/8; 343/5 DP
[58] Field of Search ................... 343/8, 9, 17.2 R, 7.5, 343/5 DP

[56] References Cited

U.S. PATENT DOCUMENTS

| | | | |
|---|---|---|---|
| 2,923,000 | 1/1960 | Wolinsky | 343/8 |
| 3,013,262 | 12/1961 | Tollefson | 343/9 |
| 3,095,563 | 6/1963 | Vladimir | 343/8 |
| 3,150,323 | 9/1964 | Stavis et al. | 343/8 |
| 3,371,341 | 2/1968 | Stavis | 343/9 |
| 3,852,744 | 12/1974 | Slater | 343/9 |

*Primary Examiner*—Maynard R. Wilbur
*Assistant Examiner*—Lawrence Goodwin
*Attorney, Agent, or Firm*—T. W. Kennedy

[57] ABSTRACT

A Doppler radar having a single sense Doppler signal from the rf mixer. A single sideband modulator in a common antenna system for transmitting and receiving shifts the fore and aft beams to achieve a single sense Doppler signal. The use of the single sideband modulator results in a differential Doppler shift between fore and aft beams of only a few hundred knots, thereby permitting use of low cost components. A single sense Doppler also reduces the Doppler passband by a 2:1 factor which permits the power supply frequency to operate at a higher frequency than the receiver.

4 Claims, 18 Drawing Figures

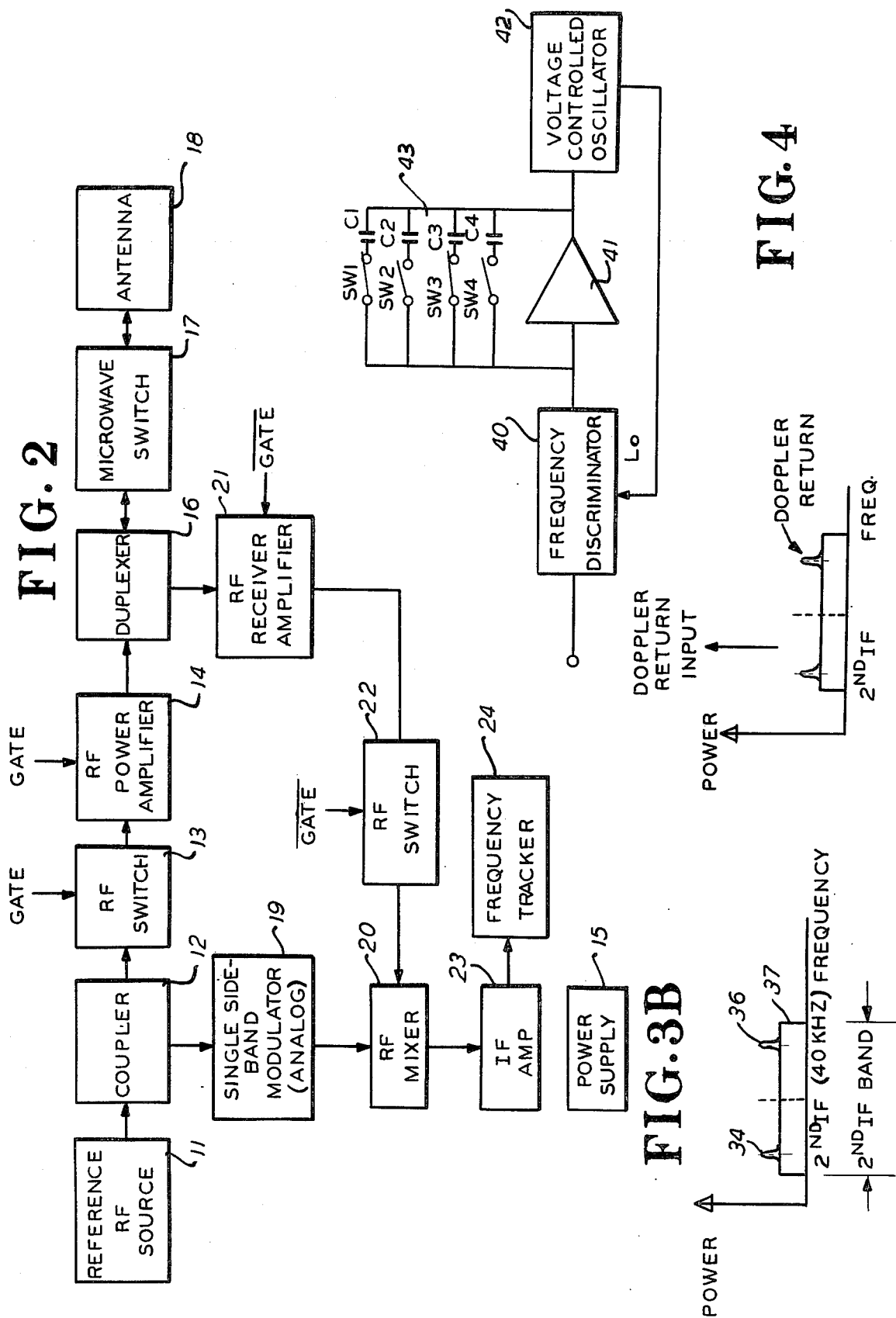

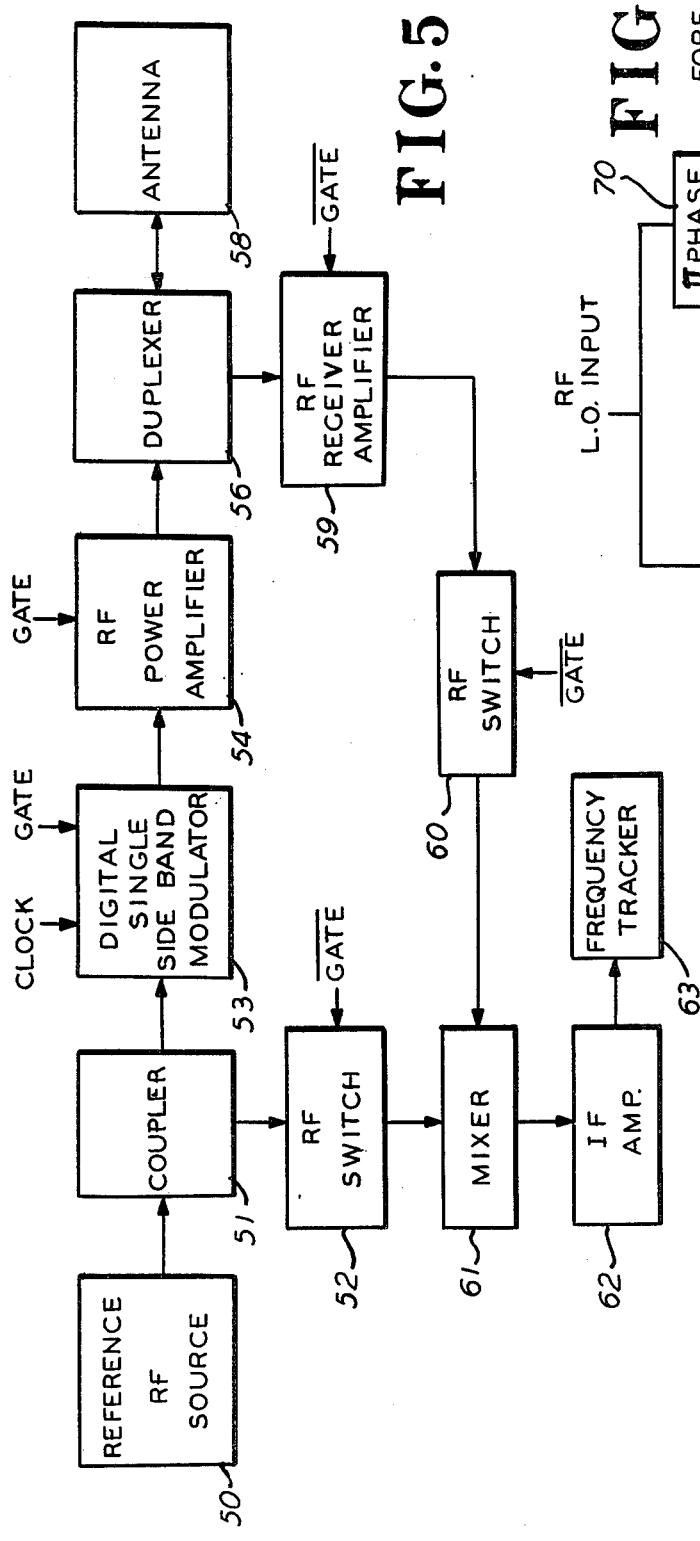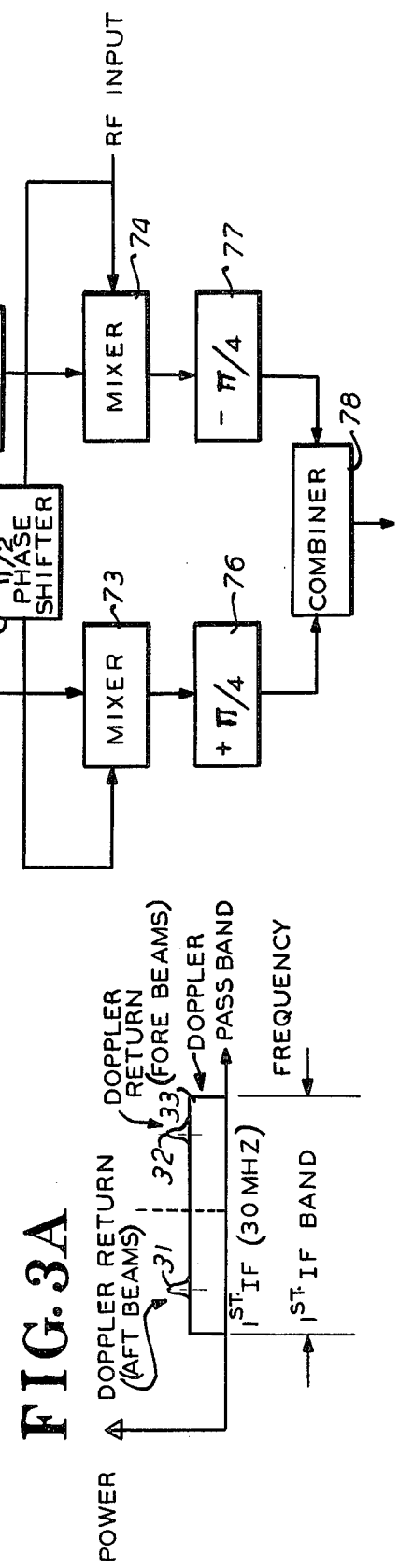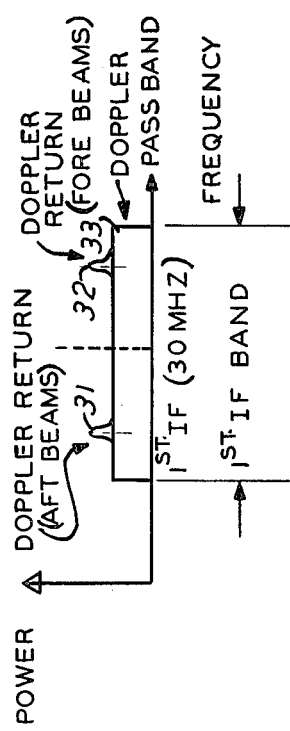

RF REFERENCE OUTPUT

DIGITAL SSB OUTPUT
—AFT BEAMS

DIGITAL SSB OUTPUT
—FORE BEAMS

RECEIVED SIGNAL
—AFT BEAMS

RECEIVED SIGNAL
—FORE BEAMS

POST—MIXER OUTPUT

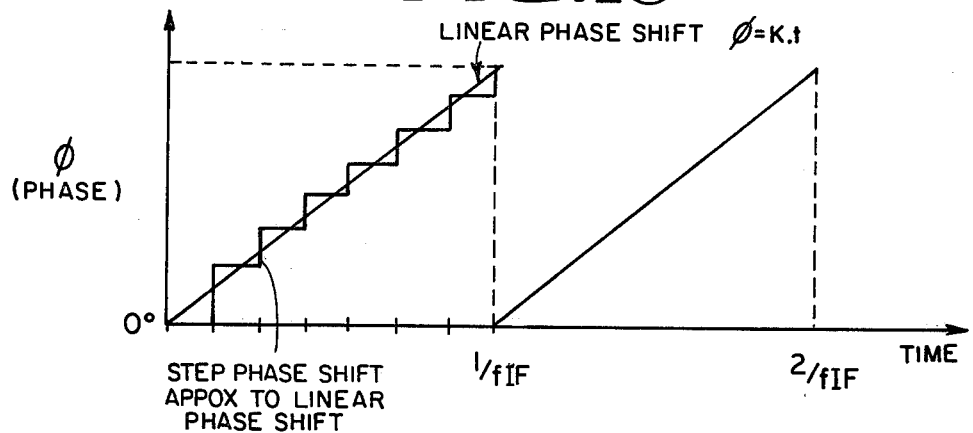
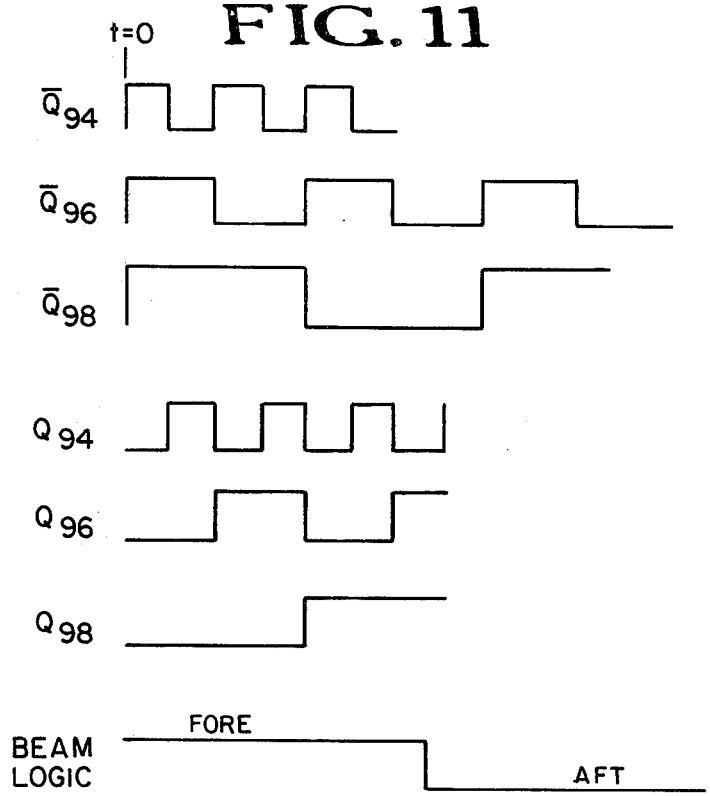

RECEIVER BANDWIDTH CONSERVATION IN A DOPPLER RADAR

STATEMENT OF THE PRIOR ART

U.S. Pat. No. 3,430,236, 2/1969, Gamertsfelder
U.S. Pat. No. 3,710,386, 1/1973, Darboven et al This invention is related to Doppler radar. More particularly, this invention is related to a Doppler radar having means to obtain a single sense Doppler signal for both the fore and aft beams.

BACKGROUND OF THE INVENTION

Modern Doppler radars utilize a single receiver channel and frequency tracker to be time shared between the Doppler shifted returns. For Doppler velocity tracking to approximately 750 knots, low cost standardized components exist to track the Doppler shifted signals of the fore beams and then, a few milliseconds later, slew and track the negative Doppler signals of the aft beam. Additionally, low speed applications require a Doppler passband only of about ±12 KHz centered around an intermediate frequency of approximately 40 KHz. This allows a power supply inverter frequency to be designed above the Doppler passband, but less than a practical upper limit 55 KHz. (This insures that power supply ripple frequencies and harmonics are out of the Doppler passband and do not cause spurious Doppler signals).

For a Doppler application where tracking is 2000 knots, the high slew rate required to go from positive to negative shifted Doppler signal precludes the use of standardized components. Furthermore, the intermediate frequency range of the receiver unit must be increased to 40 KHz ±25 KHz. This requires a power supply inverter frequency of greater than 70 KHz which is impractical for a high efficiency switching supply.

BRIEF DESCRIPTION OF THE INVENTION

The present invention provides a Doppler radar having a common antenna for transmitting and receiving. A single sideband modulator is positioned in the transmitting circuits and it provides means to track the positive Doppler shifted signals of the fore beams and then a few milliseconds later to slew and track the negative Doppler signals of the aft beams. The SSBM provides a single sense Doppler signal for both the fore and aft beams as the output from the rf mixer. This results in a differential Doppler shift between fore and aft beams of only a few hundred knots, thereby permitting use of low cost components. The single sense Doppler receiver of the invention reduces the Doppler passband by a 2:1 factor, which permits the power supply frequency to operate at a higher frequency than the receiver even for Dopplers operating at 2000 knots.

Accordingly, it is an object of this invention to provide a Doppler radar having a single sense Doppler signal for both the fore and aft beams as an output from the rf mixer.

This and other objects, features and advantages of the present invention will become apparent from the following description taken in conjunction with the accompanying drawings wherein:

FIG. 2 is a block diagram of a first embodiment of the pulse-coherent Doppler radar of the invention;

FIG. 3A shows the output signal of the rf mixer of the Doppler radar of FIG. 2;

FIG. 3B shows the input signal to the frequency tracker of the Doppler radar of FIG. 2;

FIG. 4 is a more detailed block diagram of the frequency tracker of FIG. 2;

FIG. 5 is a functional block diagram of a preferred embodiment of the Doppler radar of the invention;

FIG. 7 is a more detailed block diagram of the mixer of FIG. 5;

FIG. 10 is a graph showing the phase shift approximation occurring in the single side band modulator; and FIG. 11 shows the waveforms of signals being processed in the single side band modulator.

Figure 1:
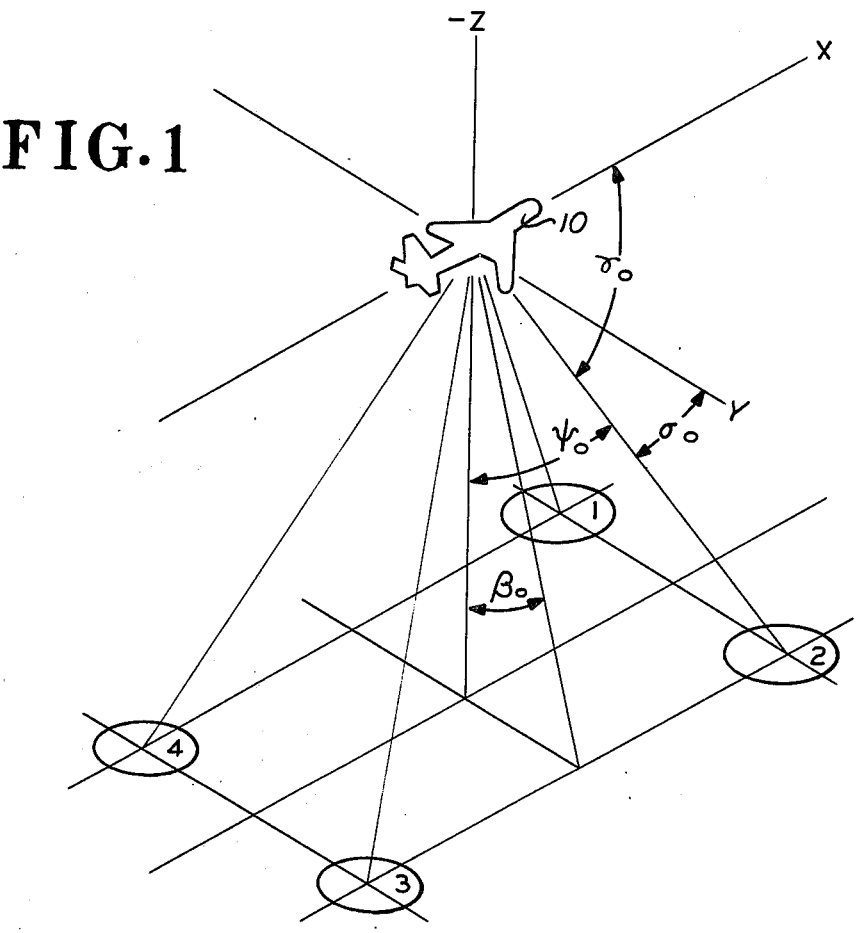
FIG. 1 is a diagram showing the radiated beams of a Doppler radar carried aboard an aircraft.

Referring now to FIGS. 1 and 2, there is shown in schematic block diagram format a first embodiment of the Doppler radar of the invention. In FIG. 1, the Doppler radar is carried aboard an aircraft 10. Aircraft 10 is shown moving along heading axis X. The Y and Z axes are orthogonal to the X axis and represent the cross heading axis and the altitude axis respectively. The Doppler radar aboard aircraft 10 radiates to the ground fore beams 1 and 2 and aft beams 3 and 4.

In the Doppler radar of FIG. 2, the transmitter, receiver and antenna are time shared by the four Doppler beams shown in FIG. 1. In operation, a rf signal from reference rf signal source 11 is applied to coupler 12. In coupler 12 a portion of the rf signal is attenuated and applied to single sideband modulator 19. The main output of coupler 12 is applied to rf switch 13 in the transmitter circuit, from rf switch 13 the rf signal is applied to rf power amplifier 14 where it is amplified prior to application to duplexer 16. As is customary, duplexer 16 serves to isolate the receiver circuits from the transmitter during transmit time. From duplexer 16, the signal is applied to microwave switch 17 and ultimately applied to antenna 18 for radiation to the ground along the axes shown in FIG. 1. Return signals are processed through the common antenna 18, through microwave switch 17, duplexer 16 and then to rf receiver amplifier 21. From rf receiver amplifier 21, the signal is applied to rf switch 22 for subsequent applications to rf receiver mixer 20. Mixer 20 also receives the local oscillator signal from single sideband modulator 19 and outputs an IF signal which is amplified in IF amplifier 23 and thence applied to frequency tracker for determination of velocity of aircraft 10. Positive gating signals are applied to rf switch 13 and rf power amplifier 14 to gate the transmitter during transmitter time. Simultaneously, rf amplifier 21 and rf switch 22 are gated with a negative gate signal to isolate the receiver during transmit time.

As shown in FIG. 1, this system radiates and receives in time sequence four beams. The output of rf mixer 20 is shown in the power versus frequency graph of FIG. 3a. The rf intermediate frequency is generally about 30 MHz and, after the second mixing operation, is approximately 40 KHz. The input to frequency tracker 24 is shown in the power versus frequency graph of FIG. 3B. In FIG. 3A, the Doppler aft beams 31 lie to the left of the IF frequency of 30 MHz, and the Doppler fore beams 32 lie to the right of the IF frequency. The Doppler passband is 50 KHz. In FIG. 3B, the Doppler aft beams 34 and the Doppler fore beams 36 lie to the left and right respectively of the second IF frequency 40 KHz with a passband 37 of 30 KHz.

The power supply 15 is usually a switching regulator designed for low weight, and operating at a switching frequency of less than 55 KHz for high efficiency. The output from the power supply has ripples at fundamental and harmonics of the switching frequency which lie in the Doppler passband. Unless extraordinary precautions are taken, these frequencies can cause undesirable Doppler signals in the passband resulting in false tracking errors.

FIG. 4 shows a more detailed block diagram of frequency tracker 24. The frequency tracker implementation is a conventional sine-cosine tracker which is time shared between the four beams. It comprises a frequency discriminator 40, amplifier 41, voltage controlled oscillator 42 and tracker integrator 43. This implementation requires the tracker integrator 43 to rapidly slew the voltage controlled oscillator from beam to beam during a very short duration (approximately 2 milliseconds) receiver off period.

In frequency discriminator 40, an error signal proportional to the frequency difference between the voltage controlled oscillator 42 (local oscillator) and the center of power of the Doppler spectrum is derived. This error signal is applied to amplifier 41 and integrator 43 which in turn positions the output frequency of voltage control oscillator 42 until the frequency difference is zero. Since the Doppler shifts for the four beams are, in general, different from each other, the integrator contains four capacitors $C_1$, $C_2$, $C_3$, $C_4$, which are switched electronically by switches $Sw_1$, $Sw_2$, $Sw_3$, $Sw_4$, in synchronism with the beam switching frequency. Each capacitor "samples" a voltage corresponding to the average Doppler shift for that beam period, and then "stores" it while the other three beams are on. The output from the frequency tracker is a switched local oscillator representing the Doppler shifts in each beam.

The time constant for the tracking drop of FIG. 4 is:

$$\gamma = \text{Constant}/(K_D \cdot K_{LO})$$

where
$K_D$ = frequency discriminator gain
$K_{LO}$ = VCO scale factor

Also, the tracker error as a function of the principal error source in a sine/cosine tracker which is the integrator drift is:

$$\epsilon = \text{Integrator Drift}/K_D$$

To convert a low speed velocity tracker into one operating up to 2000 knots requires either:

(a) increasing the voltage range of the integrator while maintaining $K_{LO}$ constant, or (b) doubling or tripling VCO scale factor.

For a high performance Doppler, neither solution is practical because:

(a) increasing the voltage range of the integrator would correspondingly increase the slew rate requirement. Hence a doubling or tripling of the velocity range would result in a slew rate requirement beyond the capability of low cost standardized components, and would necessitate expensive, complex operational amplifier to be used in the tracking integrator.

(b) increasing $K_{LO}$ (VCO scale factor) would require $K_D$ (frequency discriminator gain) to be correspondingly reduced in order to insure that the short time constant remains constant. This is required to maintain the velocity fluctuations within the linear portion of the frequency discriminator curve. However, for a given integrator bias, reduction of $K_D$ results in an increase in the error as observed from the above equation. For a high velocity system which also requires high accuracy, this is not acceptable.

Figure 6A:
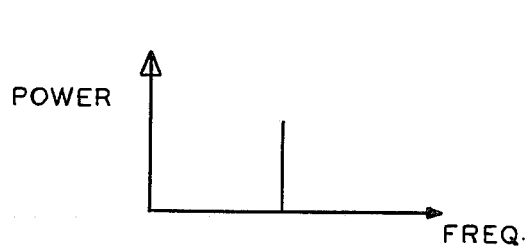
FIGS. 6A through 6F are power spectral plots of the Doppler radar of FIG. 5.

The embodiment of FIG. 5 overcomes the limitations discussed with regard to FIG. 2. In FIG. 5, the signal flow starts with rf reference oscillator 50 which outputs a CW signal at $F_o$ (13,350 MHz). A power spectral plot of the output of rf reference source 50 is shown in FIG. 6A. A small amount of the output from rf reference 50 is coupled by means of coupler 51 to the receiver circuits to be used as a coherent local oscillator for the mixer with the return Doppler shifted signal to be discussed hereafter. Most of the rf energy from the rf source 50 is applied by way of coupler 51 to digital single sideband modulator 53. Modulator 53 translates the rf signal by a step phase shift approximation to a sawtooth function. The frequency shifting (approximately 60 KHz) is employed to improve transmitter-receiver isolation, and to minimize the effects of mixer noise on the Doppler processing.

Figure 6B:
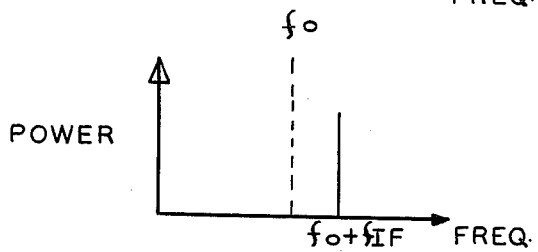
Figure 6C:
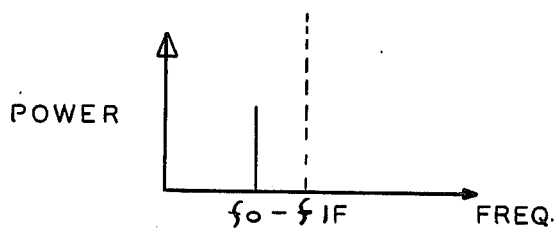

Instead of frequency translating by a fixed IF, it is proposed to frequency translate UP during the transmission of the two aft beams shown in FIG. 1, and to frequency translate DOWN during the transmission of the two forward beams shown in FIG. 1. This technique results in the fore and aft Doppler shifted returns always translating into a single sense Doppler shifted signal after the rf mixing. Power spectral plots of modulator 53 during transmission of the aft and forward are shown in FIGS. 6B and 6C respectively.

FIG. 7 is a more detailed block diagram of mixer 61. It is seen from FIG. 7 that the forward beams and aft beams logic signals are applied to $\pi$ phase shifter 70. Also applied to $\pi$ phase shifter 70 is the local oscillator input from rf switch 52. The $\pi/2$ phase shifter 72 receives a signal from rf switch 60 and outputs a signal to mixer 73. Mixer 73 also receives a signal from the local oscillator and it provides an output to $\pi/4$ phase shifter 76 which represents the shift UP frequency signal. The signal from phase shifter 76 is then applied to signal combiner 78 and thence to frequency tracker 63. Mixer 74 receives input signals from $\pi$ phase shifter 70 and rf switch 60 and provides $\pi$ signal to $-\pi/4$ phase shifter 77 which provides the frequency shift DOWN signal. This signal is then applied to combiner 78.

The image rejection receiver or mixer 61 allows selection of information either above the local oscillator (fo) in FIG. 6B, or below the local oscillator in FIG. 6C. It also results in the cancellation of the noise folded over during the mixing process, i.e. in FIG. 6D, when fo is mixed with the Doppler return at fo+fIF−fd, the background noise at fo−fIF+fd would fold over into the Doppler passband (see FIG. 6F) resulting in a degradation of Signal to Noise of 3 dB.

An explanation of FIG. 7 follows:

Let the rf L.O. input be: cos ω₀·t

When the fore beams are radiated, assume that the fore-aft logic input to the $\pi$ phase shifter 70 causes a 180° phase shift. For the aft beams, the phase shift is 0°.

Thusly, for the fore beams, the L.O. inputs to the left mixer 73 and right mixer 74 are:

Cos ωot—left mixer 73
−Cos ωot—right mixer 74
For the aft beams, the L.O. inputs are:
Cos ωot—left mixer 73
Cos ωot—right mixer 74

The rf input for the fore and aft beams (FIGS. 6E and 6D) can be represented as:
Cos (ωo−ωIF+ωd)·t Fore beams
Cos (ωo+ωIF−ωd)·t aft beams The rf input to the left mixer 73 in FIG. 7 is rf phase shifted by 90° resulting in a mixer input of:
sin (ωo−ωIF+ωd)·t Fore Beams
sin (ωo+ωIF−ωd)·t Aft Beams These signals are converted in the two mixers as follows:
Fore Beams
Cos ωot×sin (ωo−ωIF+ωd)·t left mixer 73
−Cos ωot×cos (ωo−ωIF+ωd)·t right mixer 74
Aft Beams
Cos ωot×sin (ωo+ωIF−ωd)·t left mixer 73
Cos ωot×sin (ωo+ωIF−ωd)·t right mixer 74

Taking only the difference cross products results in the following outputs:
Fore Beams
−Cos (ωIF−ωd)·t left mixer 73
−Sin (ωIF−ωd)·t right mixer 74
Aft Beams
Cos (ωIF−ωd)·t left mixer 73
Sin (ωIF−ωd)·t right mixer 74

Figure 6D:
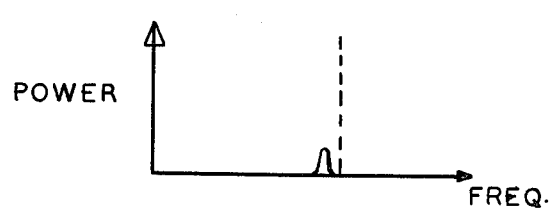

These signals are then passed through a quadrature network 76, 77 and 78 and combined, resulting in the following:
−Cos (ωIF−ωd)·t−Cos (ωIF−ωd)·t fore
Cos (ωIF−ωd)·t+Cos (ωIF−ωd)·t aft The noise, which is present, at the image frequency of the Doppler return about ωo, e.g. at ωo−ωIF+ωd in FIG. 6D, are rejected by the proposed configuration. It can be shown that the noise samples into the combiner 78 in FIG. 7 are 180° out of phase, resulting in a cancellation of this foldover noise component, rather than a signal summation as shown in the above expression.

FIGS. 6B, 6C and 6D are plots of RF power versus frequency.

In FIG. 6B, it is shown that for the two aft beams, (those beams radiated toward the rear of the aircraft), the continuous wave signal at fo (see FIG. 6A), is frequency translated by fIF to fo+fIF. This operation is performed by the Digital SSB and occurs only when the RF transmitter is ON. The reason for translating to a higher frequency instead of frequency translating down is that the two aft beams are assumed to be only negative Doppler shifted (i.e. the return echo is at a lower frequency than the transmitted signal).

Similarly in FIG. 6C, the RF transmitter for the fore beams is generated by negatively frequency translating the continuous wave (cw) signal in FIG. 6A. The prior knowledge that the echo from the fore beams will be positive Doppler shifted insures that after the mixing operation with the cw signal in FIG. 6A, the echo will lie within the Doppler passband. (Reader should observe in FIG. 6D and 6E that echo is about the same distance in frequency from the reference frequency at fo. This results in both signals falling within the narrow Doppler passband after mixing.

Figure 8:
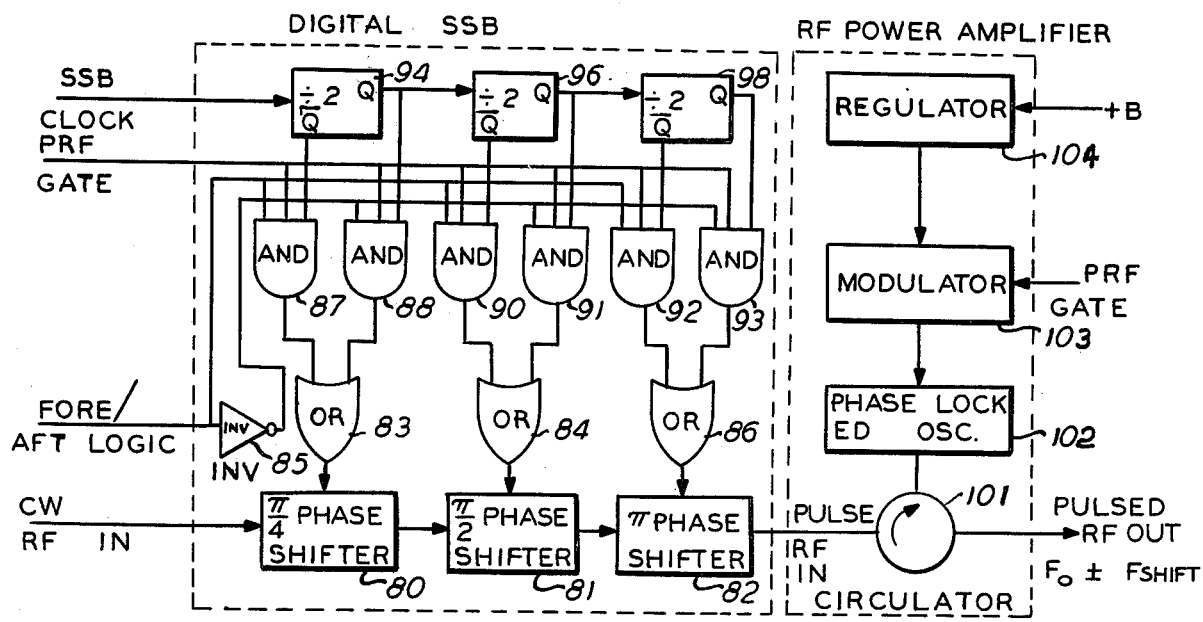
FIG. 8 is a more detailed block diagram of the single sideband modulator of FIG. 5.
Figure 9A:
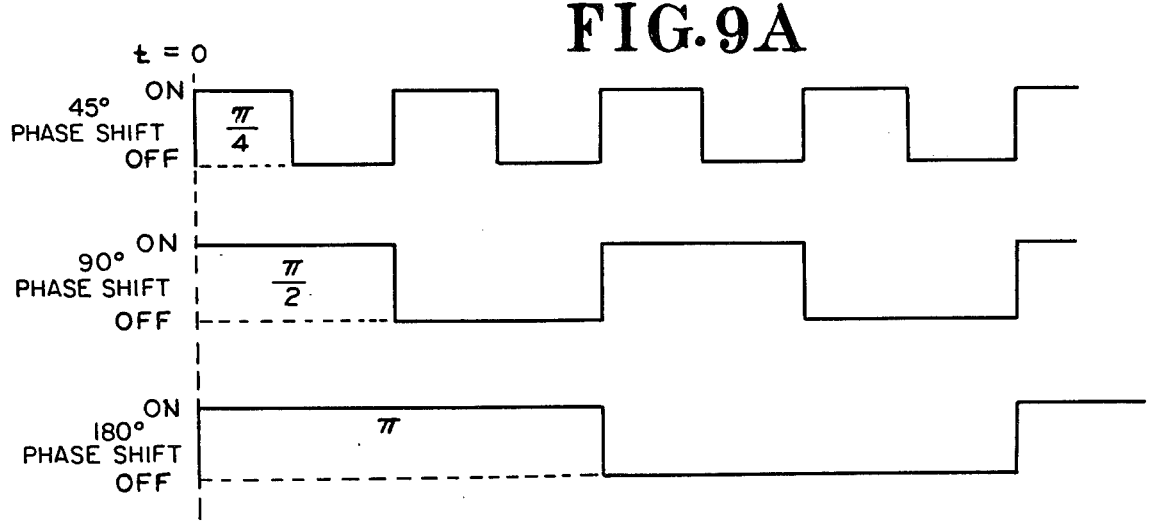
FIGS. 9A and 9B are graphs showing the decreasing rf phase shift slope and the increasing rf phase shift resulting from the beam logic circuits of the single sideband modulator.
Figure 9B:
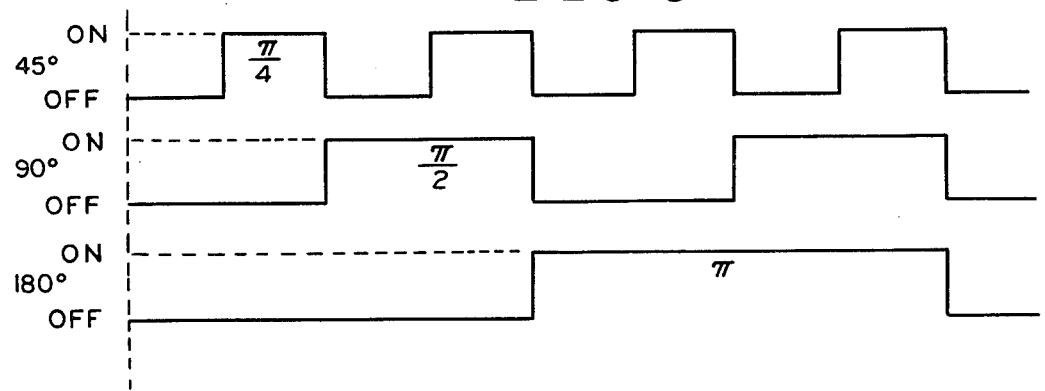

As illustrated in FIG. 8, modulator 53 comprises phase shifters 80, 81, 82, OR gates 83, 84, 86, inverter 85, AND gates 87, 88, 90, 91, 92, 93 and binary counters 94, 96 and 98. The input to phase shifter 80 is a CW rf signal. The output of phase shifter 80 is applied to phase shifter 81 which in turn provides an output to phase shifter 82. The digital phase shifter waveforms are shown in FIG. 9A. These signals are applied simultaneously with the PRF gate signals to AND gates 88, 89, 90, 91, 92 and 93. If a "Fore" beam logic "1" is applied through inverter 85 to the AND gates, it will activate the digital phase shifters causing a decreasing phase shift as shown in FIG. 9A. This results in a downward frequency translation. On the other hand, a "0" logic or "Aft" beam logic command will result in an increasing phase shift as shown in FIG. 9B, resulting in an upward frequency translation.

The function of the Digital SSB is to frequency offset RF transmitter from the RF receiver. The reason for having an intermediate frequency is two fold: 1. With a non-zero IF frequency system the noise from the RF transmitter does not degrade the overall system receiver sensitivity and does not have a slope which degrades the accuracy of the frequency tracker operation. 2. By having an intermediate frequency which is turned on and off (as in this system), the isolation between the RF transmitter and receiver is improved by greater than 50 dB.

The Digital SSB has three RF phase shifters which are switched in at a rate which approximates a linear phase shift.

If the input to the frequency translator is cos $\omega_c t$, and the translator varies the phase of the input at a constant rate, or $\omega_{IF} T$ where $\omega_{IF}$ is a constant, and t is time, then the output is cos $(\omega_c t + \phi)$ or cos $(\omega_c t + \omega_{IF} t) =$ cos $(\omega_c + \omega_{IF})\cdot t$. Hence the Hence, has frequency shifted the input by $\omega_{IF}$.

The digital SSB utilizes three RF phase shifters which can be independently switched (see FIG. 10) to the following status: 0° or 45°, 0° or 90°, 0° or 180°. The principle of operation is to progressively increase the RF phase in steps of 45° at a rate resulting in 360° of phase shift in a time period of $1/f_{IF}$, because, this process is only an approximation to a linear phase shift harmonics are generated. For this configuration of three R phase shifters, the most significant ones are at eight times the frequency, IF. However, by selecting the pulse repetition or gating frequency (Prf) to be smaller than the harmonic frequencies (8. IF), the Doppler returns associated with these harmonic frequencies will after demodulation always lie outside the receiver passband and have no adverse affect on system operation.

Description of Digital SSB Operation

Referring to FIGS. 8, 9A, 9B and FIG. 11, the detailed operation of SSB is described as follows:

The waveforms of the countdown circuit in FIG. 8 (items 94, 96 and 98) and the fore/aft logic (item 85) are shown in FIG. 8.

It is observed that when the beam logic is high (indicating a fore beam state), the AND gates 87, 90 and 92 are selected and AND gates 88, 91 and 93 are disabled. The input to the OR gate is from the $\overline{Q}$ output of the countdown circuit (shown in FIG. 11).

Referring to FIG. 9A, it is observed that as time progresses, the RF phase shifting decreases by 45° during each ⅛ period of each offset frequency cycle. It can be shown that this is a "staircase" approximation to a constant negative phase shift with time of $-\kappa \cdot t$ where $\kappa$ is a constant and T is time. The CW RF signal output is then:

$$\cos(\omega ct + \phi) = \cos(\omega ct - \kappa \cdot t)$$
$$= \cos(\omega_c - \kappa) \cdot t$$

where cos ωct is the CW RF input. If the half periods are selected, that 360° phase shift occurs within 1/fiF, then the RF output is Similarly, for the aft beams the Q outputs are selected resulting in an increasing phase shift with time as shown in FIG. 9B. This results in an output of cos $(\omega_c + \omega_{IF}) \cdot t$.

The PRF clock operates at a high frequency to permit the frequency shifting only when the RF transmitter is ON. When the RF receiver is ON, the PRF gate is logic LOW resulting in all RF phase shifters at zero phase and therefore no frequency translation occurs. Hence, when the RF receiver is ON, and portion of the transmitter which "leaks" into the receiver will demodulate to zero frequency and will be eliminated by the filters in the Doppler receiver.

The output of the digital phase shifter is applied to circulator 101 of power amplifier 54 to phase lock oscillator 102. Power amplifier 54 is also gated by a PRF signal applied to modulator 103 in synchronism with the digital SSB in order to conserve power and reduce noise output during the receiver time interval. Regulator 104 is employed to control voltage applied to modulator 103. As a locked oscillator rf power amplifier 54 is also a good limiter, thus reducing interpulse amplitude modulation effects and improving spectral quality. The output of digital modulator 53 is amplified by rf amplifier 54. The output of rf amplifier 54 is applied to the antenna assembly 58 by way of duplexer 56. The transmitter and receiver are alternated in time at a 50% duty ratio. This permits a common antenna to be used for both transmitting and receiving.

Figure 6E:
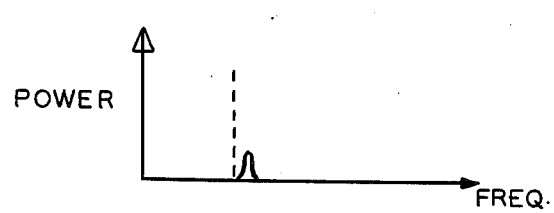
Figure 6F:
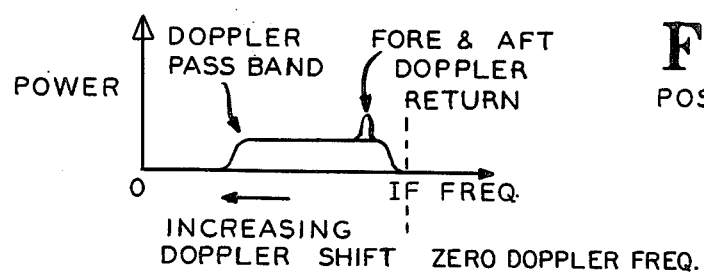

A portion of the transmitted signal backscattered from the ground is intercepted by antenna 58 and routed by way of duplexer 58 to rf receiver amplifier 59. Spectral power plots of the Doppler shifted return for the aft and fore beams are shown in FIGS. 6D and 6E respectively. The output from receiver amplifier 59 is fed by way of rf switch 60 to image rejection mixer 61. Here the rf received signal is mixed in two balanced mixers 73, 74 (FIG. 7) with quadrature components of the rf local oscillator. A unique approach is employed to select the upper sideband for the aft beams and to select the lower sideband for the fore beams. This is realized by phase shifting by 180°, the sine local oscillator component into the balanced mixers 73, 74 in synchronism with the rf transmission and receiving of the fore and aft beams. The resultant output of the image rejection receiver is shown in FIG. 6F.

It is observed that the range of frequency tracking has been reduced by a factor of 2:1 which allows the local oscillator scale factor to remain constant. This in turn maintains a constant frequency discriminator scale factor and, therefore, no increased error due to integrator bias. Also, an extremely high slew rate for the tracker integrator is no longer required since even at a high speed the differential Doppler shift from beam to beam is only a few hundred knots versus the 3,600 knots [1800 knots (fore beam)+1800 knots (aft beam)] of the previous technique. With the relaxation of a slew rate required, the integration is implemented with a low cost, standardized operational amplifier. Furthermore, since the digital SSBM can translate at a frequency of 50 KHz (versus analog SSB's which can translate and reject the image signal only at offset frequencies in the megahertz range), a power supply inverter frequency can be chosen at 55 KHz and no power supply frequencies will lie within the Doppler passband, noting FIG. 6F.

While particular embodiments of the invention have been shown and described, modifications may be made, and it is intended in the following claims to cover the embodiments which fall within the true spirit and scope of the invention.

What is claimed is:

1. A Doppler radar comprising:
    a transmitter,
    a receiver,
    a common antenna connected to said transmitter and said receiver said antenna radiating in time sequence a pair of forward beams and a pair of aft beams,
    a source of rf reference signals comprising coherent radar signals for simultaneous use in said transmitter and receiver,
    means for isolating said rf reference signals from said receiver and for attenuating a portion of said rf reference signals for coupling to said receiver for use as a local oscillator in said receiver,
    means responsive to said isolating and coupling means for frequency translating said rf reference signals during transmit time,
    means connected to said translating means for phase locking said translated rf reference signals,
    means connected to said phase locking means for decoupling said receiver from said transmitter during transmit time and decoupling said transmitter from said receiver during receive time,
    means connected to said decoupling means for amplifying said received signals, and
    a gateable image rejection mixer in said receiver for rejecting the foldover noise by cancellation of the lower sideband noise during processing of the upper sideband aft received signal and by cancellation of the upper sideband noise during processing of the lower sideband fore received signal.

2. The Doppler radar of claim 1 comprising:
    a first rf switch for applying said attenuated rf reference signals to said mixer,
    a second rf switch for applying said received signals to said mixer,
    means connected to said first and second rf switches for gating said switches during receive time,
    a frequency tracker, and
    means for amplifying the output of said mixer for application to said frequency tracker.

3. A single sense Doppler radar comprising:
    a transmitter,
    a receiver,
    a common antenna connected to said transmitter and said receiver for transmission and reception of radar signals said antenna radiating a pair of forward beams and a pair of aft beams,
    a source of rf signals having a constant frequency,
    means in said transmitter and said receiver for digitally translating the frequency of said rf signals up during transmission of said aft beams and for digitally translating the frequency of said rf signals down during transmission of said forward beams,
    a mixer in said receiver for mixing a portion of said rf signals with received signals, and a phase shifter in said mixer for selecting the upper sideband of return signals of said aft beams and for selecting the lower sideband of return signals of said forward beams whereby the fore and aft Doppler shifted returns are translated into a single sense and the noise foldover resulting from the mixing process is eliminated in said receiver.

4. The Doppler radar of claim 3 comprising:
a power supply for said Doppler radar, and
wherein said means for translating said rf signals comprises a digital single sideband modulator for offsetting said rf reference signals and for providing an IF frequency in said receiver substantially lower than the ripple frequency of said power whereby said power supply ripple frequencies are prevented from modulating the Doppler passband frequency of said IF.

* * * * *